United States Patent
Papale et al.

(10) Patent No.: US 8,020,769 B2
(45) Date of Patent: Sep. 20, 2011

(54) HANDHELD AUTOMATIC TARGET ACQUISITION SYSTEM

(75) Inventors: Thomas F. Papale, Sterling, MA (US); Jeffrey E. Carmella, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1113 days.

(21) Appl. No.: 11/804,832

(22) Filed: May 21, 2007

(65) Prior Publication Data

US 2008/0290164 A1 Nov. 27, 2008

(51) Int. Cl.
*G06F 19/00* (2006.01)
(52) U.S. Cl. ............................. 235/414; 356/3
(58) Field of Classification Search .................. 235/404, 235/414
See application file for complete search history.

(56) References Cited

U.S. PATENT DOCUMENTS

| | | | | |
|---|---|---|---|---|
| 4,121,890 A | * | 10/1978 | Braun | 356/4.02 |
| 4,949,089 A | * | 8/1990 | Ruszkowski, Jr. | 342/52 |
| 5,742,379 A | * | 4/1998 | Reifer | 356/5.07 |
| 7,210,392 B2 | * | 5/2007 | Greene et al. | 89/41.03 |
| 7,555,383 B2 | * | 6/2009 | Siegel | 701/207 |
| 2003/0146869 A1 | * | 8/2003 | Lin et al. | 342/357.14 |
| 2005/0087649 A1 | * | 4/2005 | Sims et al. | 244/3.16 |
| 2007/0097351 A1 | * | 5/2007 | York et al. | 356/5.02 |
| 2007/0273871 A1 | * | 11/2007 | Galli | 356/139.01 |

* cited by examiner

Primary Examiner — Seung H Lee
Assistant Examiner — Sonji Johnson
(74) Attorney, Agent, or Firm — Schwegman, Lundberg & Woessner, P.A.

(57) ABSTRACT

A target acquisition system. The novel system includes a housing, a first mechanism for obtaining position coordinates of the housing, a second mechanism for measuring a pointing angle from the housing toward a target, and a third mechanism for calculating coordinates of the target using the pointing angle and housing coordinates. The system may also include a fourth mechanism for determining a distance between the housing and the target, and a control circuit for receiving a user signal and in response thereto acquiring the housing coordinates, pointing angle, and distance data. The target coordinates may be calculated from the housing coordinates, pointing angle, and distance data, or from two or more sets of position coordinates and corresponding pointing angle data. The system may also include a transmitter for automatically transmitting the target coordinates to a remote weapons system or network.

21 Claims, 4 Drawing Sheets

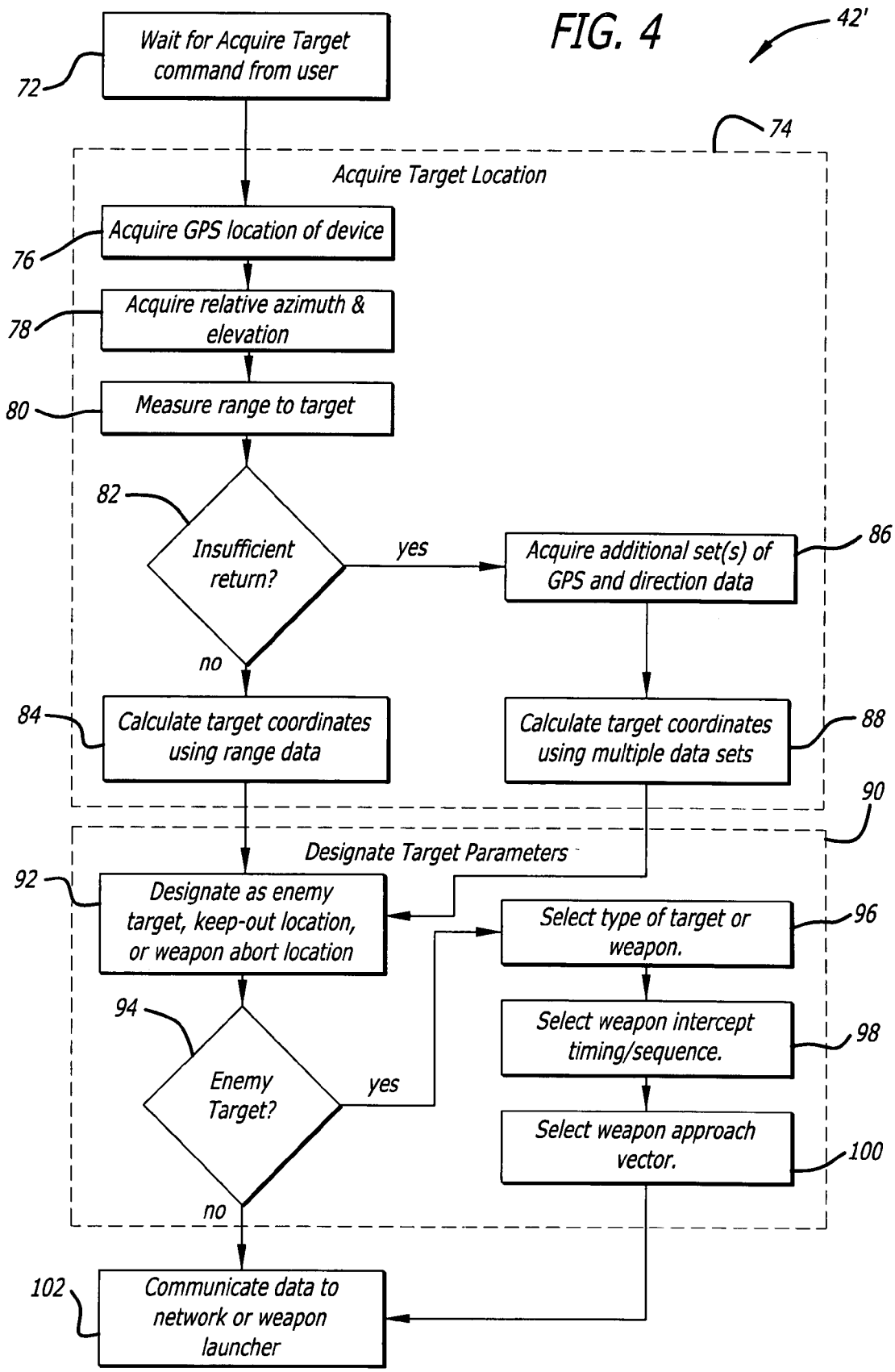

HANDHELD AUTOMATIC TARGET ACQUISITION SYSTEM

BACKGROUND OF THE INVENTION

1. Field of the Invention

The present invention relates to electronics and electrical systems. More specifically, the present invention relates to target acquisition systems.

2. Description of the Related Art

Many air-to-ground weapons systems utilize a ground-based soldier (commonly termed "warrior") to provide target position data, which is then used by a missile system to lock onto the target. Current schemes include the use of laser designation of the target, which typically requires the warrior to constantly illuminate the target with a laser, placing the warrior at risk of detection.

An alternative target acquisition solution is to have the warrior calculate the absolute coordinates of the target location using a map and/or other equipment and then radio the coordinates to the missile launch system or to command personnel. The warrior may have electronic equipment to help in this calculation, such as a GPS (Global Positioning System) receiver for determining the warrior's position, a laser rangefinder for measuring the distance to the target, and/or a handheld calculator or computer. However, it may still take several minutes to set up the different pieces of equipment, take measurements, input measurements to the computer, calculate the target's coordinates, and radio the coordinates to the network.

Thus, in both schemes, the warrior must spend more time than is desirable to acquire the target position, time during which the warrior may be at risk of detection or exposed to enemy fire.

Hence, a need exists in the art for an improved system or method for acquiring a target location that requires less time than prior approaches.

SUMMARY OF THE INVENTION

The need in the art is addressed by the target acquisition system of the present invention. The novel system includes a housing, a first mechanism for obtaining position coordinates of the housing, a second mechanism for measuring a pointing angle from the housing toward a target, and a third mechanism for calculating coordinates of the target using the pointing angle and housing coordinates. The system may also include a fourth mechanism for determining a distance between the housing and the target, and a control circuit for receiving a user signal and in response thereto acquiring the housing coordinates, pointing angle, and distance data. The target coordinates may be calculated from the housing coordinates, pointing angle, and distance data, or from two or more sets of position coordinates and corresponding pointing angle data if distance data is unavailable. In a preferred embodiment, the system also includes a transmitter for automatically transmitting the target coordinates to a remote weapons system or network. In an illustrative embodiment, the first mechanism includes a GPS receiver, the second mechanism includes a digital compass and/or an inclinometer, and the fourth mechanism includes a laser rangefinder.

BRIEF DESCRIPTION OF THE DRAWINGS

FIG. 4 is a simplified flow diagram of an example target acquisition control circuit designed in accordance with an illustrative embodiment of the present teachings.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
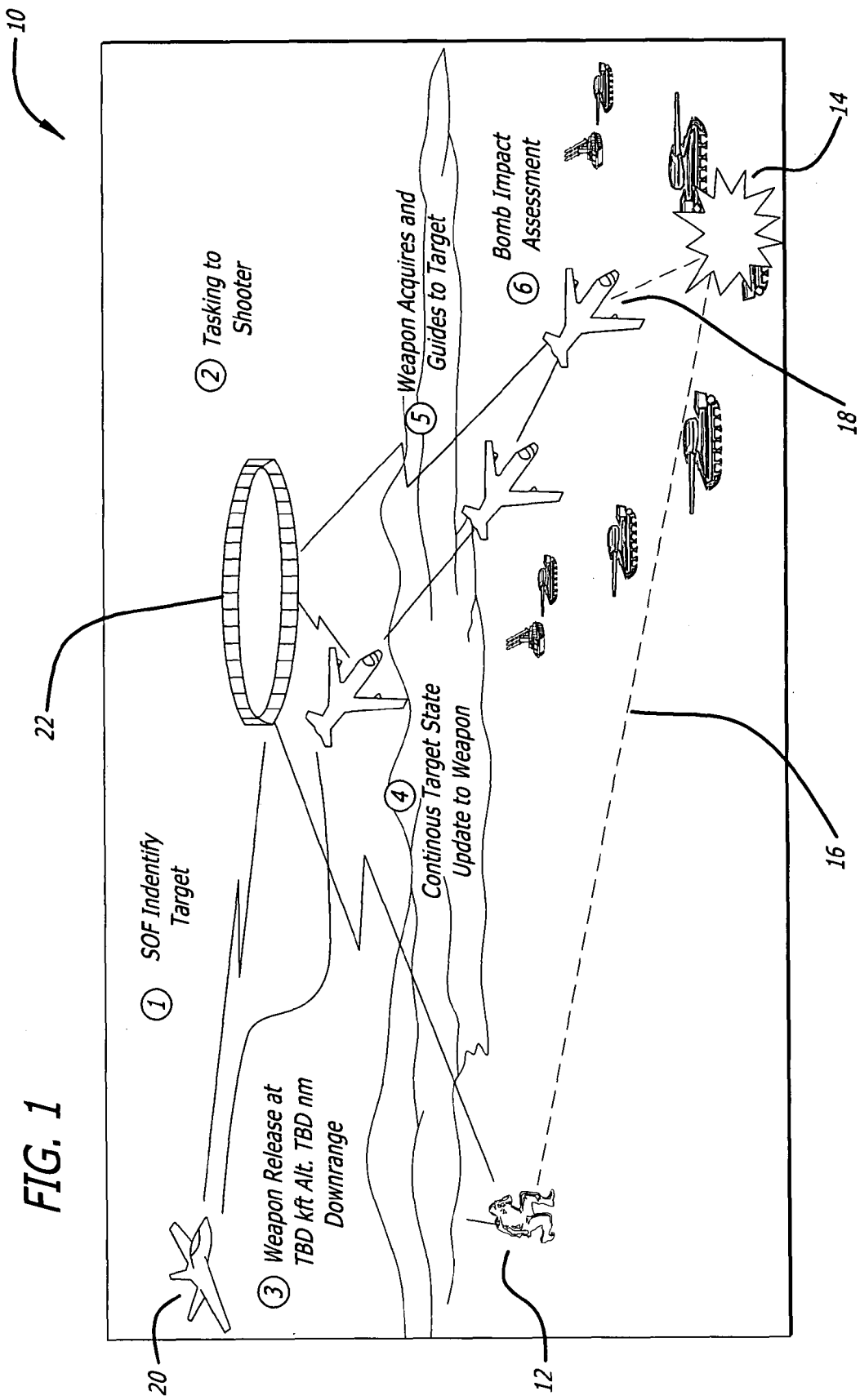
FIG. 1 is a diagram illustrating an example scenario using a conventional target acquisition technique.

FIG. 1 is a diagram illustrating an example scenario 10 using a conventional target acquisition technique. In the example scenario 10, a ground-based warrior 12 designates a target 14, which is to be destroyed or fired upon, by illuminating it with a laser beam 16. The target 14 may be, for example, a building, weapon, or vehicle. The weapons system, which in this example includes a missile 18 fired from an aircraft 20, uses the laser illumination to guide the missile 18 toward the target 14. Typically, the warrior 12 must continually illuminate the target 14 until it is destroyed, leaving the warrior 12 at risk of detection.

As described above, an alternative target acquisition method is to have the warrior 12 calculate the coordinates of the target 14 and radio the coordinates to the missile launch system, or to a battlefield network 22 (e.g., to command personnel). With either target acquisition scheme, the time taken by the warrior 12 to acquire the target 14 leaves him at risk of detection and/or exposed to enemy fire.

The present invention addresses the problem of excessive time and human calculation currently spent by land combat warriors to acquire a target and transmit its location to a weapon control system or to weapon control personnel. In accordance with the present teachings, target acquisition is automated by integrating multiple technologies into a single device, allowing a target location to be acquired and transmitted quickly and easily by, for example, having the user simply push a button on the device.

Figure 2:
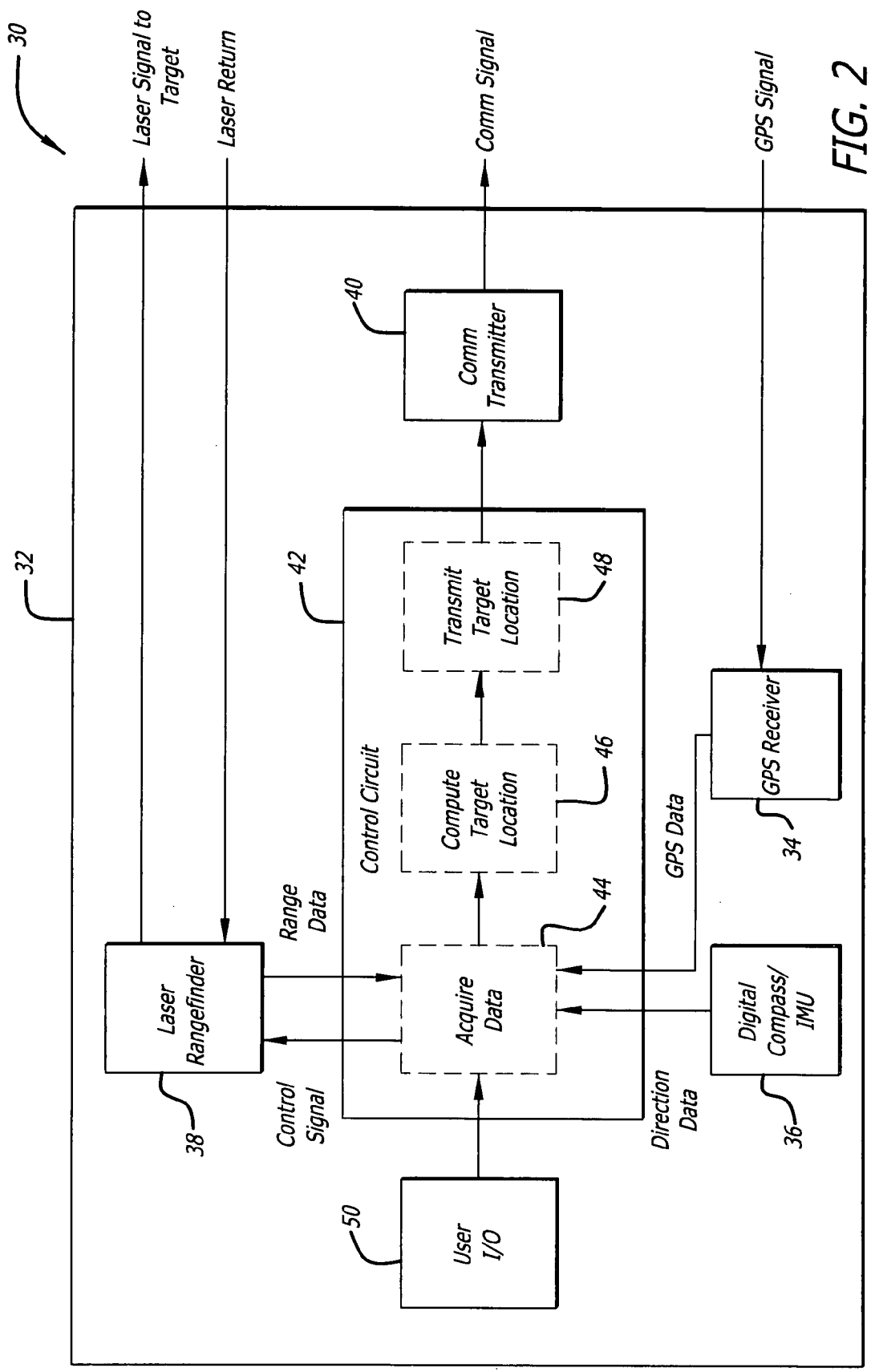
FIG. 2 is a simplified block diagram of a target acquisition system designed in accordance with an illustrative embodiment of the present teachings.

FIG. 2 is a simplified block diagram of a target acquisition system 30 designed in accordance with an illustrative embodiment of the present teachings. The novel target acquisition system 30 includes a housing 32, a GPS receiver 34 for determining the location (latitude, longitude, and altitude) of the housing 32; a digital compass, solid-state IMU (inertial measurement unit), and/or other inclinometer 36 for determining a direction or point angle (relative azimuth and elevation) toward which the housing 32 is pointed; a laser rangefinder 38 for determining a distance to the target; and a communications transceiver or transmitter 40 for linking to a weapon control system and/or battlefield network.

The system 30 also includes a control circuit 42 that controls the acquisition and transmission of data in response to commands input by the user. In the illustrative embodiment, the control circuit 42 includes a first circuit 44 that waits for a user command from a user interface 50 and, upon receiving an "acquire target" command, instructs the GPS receiver 34, digital compass/IMU 36, and laser rangefinder 38 to acquire data. A second circuit 46 uses the acquired data (including the GPS position data, IMU direction data, and laser rangefinder distance data) to compute the target's position. After the target's coordinates are calculated, a third circuit 48 instructs the transmitter 40 to transmit the target's coordinates to the missile launch system or battlefield network. The missile system or command personnel can then use the target position data to fire a missile at the target.

In the preferred embodiment, the target acquisition system 30 is implemented in a portable, handheld device, and also includes an optical sight, similar to binoculars or a rifle scope, for aiming the device.

Figure 3:
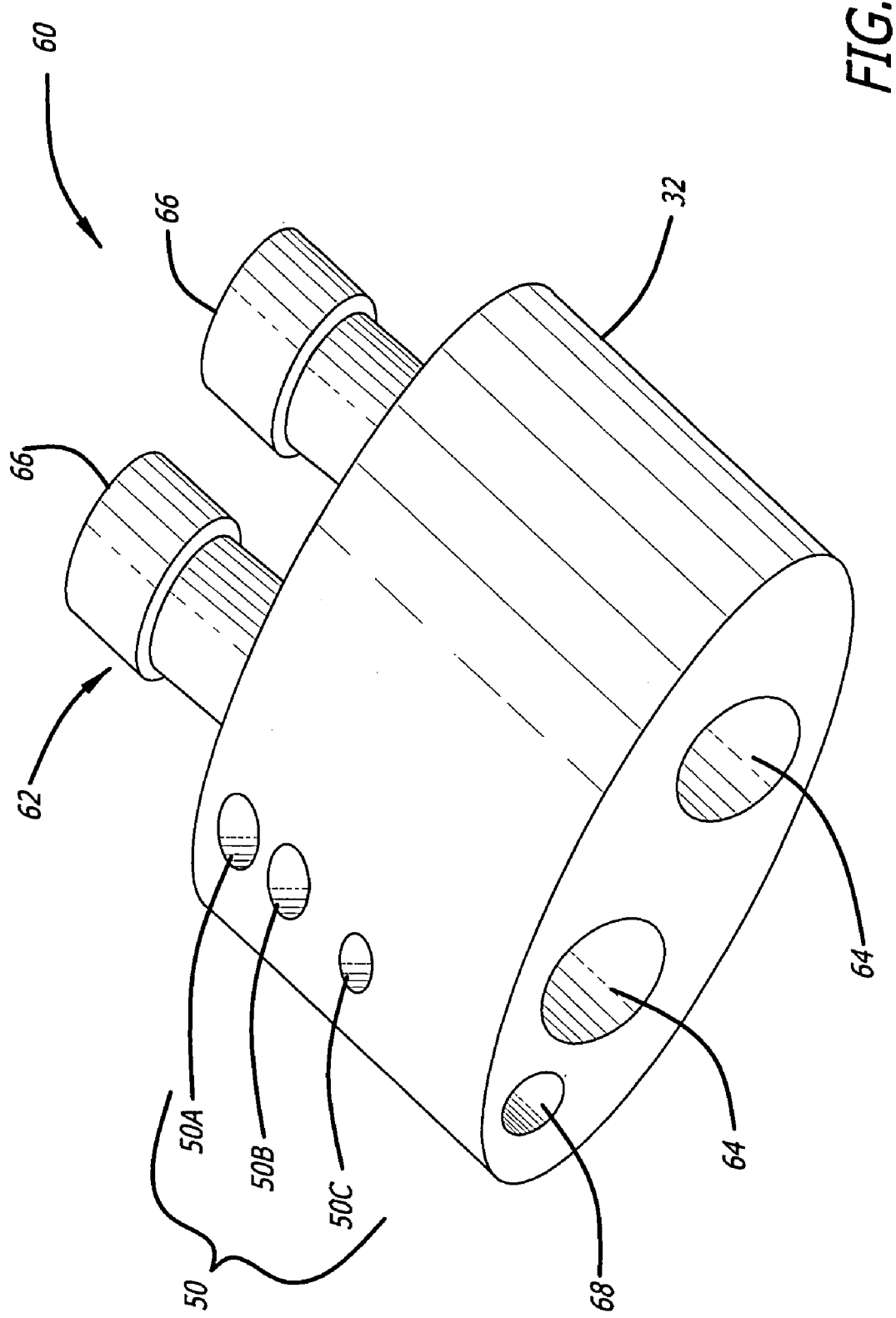
FIG. 3 is a three-dimensional view of a target acquisition device designed in accordance with an illustrative embodiment of the present teachings.

FIG. 3 is a three-dimensional view of a target acquisition device 60 designed in accordance with an illustrative embodiment of the present teachings. In this embodiment, the device 60 includes a binoculars-like optical sight 62, which includes lenses 64 that collect light from a scene and provide an image of the scene that can be viewed by the user through the sight eyepieces 66. The optical sight 62 is used by the user to aim the device 60 toward the target to be acquired. The optical sight 62 and the components of the target acquisition system 30 shown in FIG. 2 are housed in the device housing 32.

The housing 32 may also include a window 68 for the laser rangefinder 38. The laser rangefinder 38 transmits a laser beam through the window 68 toward the target, and receives a laser return signal from the target through the window 68.

The device 60 also includes some type of user interface 50 for allowing a user to input commands to the control circuit 42 (shown in FIG. 2). In the illustrative embodiment, the device 60 includes three buttons 50A, 50B, and 50C on the top of the housing 32. Other implementations may also be used without departing from the scope of the present teachings. Optionally, the device 60 may also include some kind of display for communicating information to the user. For example, the display may include different colored lights (such as a small dot that can be viewed in the optical sight 62, or an LED in the housing 32) for confirming commands made by the user, or a digital readout showing the data acquired and/or computed by the target acquisition system 30 or showing a menu of command options that can be selected by the user. In a preferred embodiment, the user display is superimposed over the target image formed in the optical sight 62, similar to a sight reticle (e.g., crosshairs), so that the user can interface with the system 30 while aiming the device 60.

In operation, a warrior wishing to place firepower onto a target aims the device 60, "fires" (by pushing button 50A, for example), and forgets. The device 60 calculates the target's location, radios both the warrior's location and the target's location to the missile launch system or network, and a missile is dispatched to the target. The actual decision to launch may or may not involve non-battlefield personnel, depending on whether the system is used in a "stand-alone" mode (directly linked to and controlling the missile launch system) or is linked to the battlefield network. The missile or other weapon may be located on any platform (e.g., ground, aerial, or sea-based).

The target acquisition system 30 may also include logic for computing a target's location without laser rangefinder data. In certain situations, the laser rangefinder 38 may not receive a sufficient return signal from the target due to excessive distance, surface characteristics of the target, or brush interference, etc. A second mode of operation may be used in this case to automatically derive the target's location from the GPS coordinates and azimuth/elevation direction data of two or more warriors (each using a separate target acquisition device) pointing at the target from different angles, or from two or more sets of data collected from different angles by a single warrior. The target location can be computed by finding the intersection of the different sets of data.

If different devices 60 are used to acquire the different sets of data, one (master) device can be configured to receive the data transmitted by the other devices 60, calculate the target location, and transmit the target location to the missile launch system or battlefield network. The other devices 60 are configured to transmit their data to the master device. Alternatively, all devices 60 may be configured to transmit their GPS and direction data to the missile system or battlefield network. The missile system or command personnel can then use the data to calculate the target's location.

If a single device 60 is used to acquire multiple sets of data, the device 60 can be configured to store the first set(s) of data and wait for the warrior to acquire more data from a different angle. The additional data set does not need to be acquired immediately; there may be a long period of time (hours or days, for example) between acquisition of data sets, and the device 60 may be used to acquire other targets during this time.

The "target" being acquired by the system 30 may not necessarily be an enemy target to be fired upon. The target acquisition system 30 may also be used to calculate the coordinates of other types of locations, such as "keep-out" locations that should not be harmed. In a preferred embodiment, the device 60 includes two user interface buttons for acquiring target locations: a first button 50A for acquiring targets to be destroyed or fired on, and a second button 50B for acquiring keep-out locations. Alternatively, the target designation (destroy or keep-out) may be selected from, for example, a displayed menu. If desired, a third button 50C may be used to confirm and transmit data.

Optionally, the target acquisition system 30 may be configured to communicate or control additional parameters. For example, the user may be able to select the type of weapon to use (controlling how powerful of an explosion to deliver to the target), control weapon timing (firepower can be delivered immediately or wait a requested amount of time), or compute a desired missile flight path (based on topography, nearby buildings or keep-out locations, etc.).

FIG. 4 is a simplified flow diagram of an example target acquisition control circuit 42' designed in accordance with an illustrative embodiment of the present teachings. At Step 72, the circuit 42' waits for an "acquire target" command from the user. In the embodiment of FIG. 3, this command is issued when the user pushes button 50A or 50B.

Upon receiving an acquire target command from the user interface 50, the control circuit 42' begins to acquire the target location (Step 74). This includes the following steps: At Step 76, acquire the GPS location of the device 60 from the GPS receiver 34. At Step 78, acquire the relative azimuth and elevation data (indicating in which direction the device 60 is aimed) from the digital compass/IMU 36. At Step 80, measure the range to the target by instructing the laser rangefinder 38 to transmit a laser pulse toward the target and calculate the range based on the time it takes to receive a laser return from the target. At Step 82, determine if there was an insufficient laser return to calculate the range to the target. If no, then calculate the target's coordinates from the GPS data, direction data, and range data (Step 84). If yes, then indicate to the user (using, for example, a display as described above) that he should acquire an additional set of GPS and direction data from a different angle. After the additional data set is acquired, then calculate the target's coordinates using the two (or more) sets of GPS and direction data (Step 88).

After the target's coordinates are calculated, the circuit 42' may be configured to designate additional parameters to the target (Step 90). For example, at Step 92, designate the target as an enemy target (to be fired on), a keep-out location, or a "weapon abort" location (a location where a missile should go if the mission is aborted after the missile is fired). This designation may depend on which button the user pushed to begin the target acquisition (as described above), or it can be selected by the user from, for example, a displayed menu. At Step 94, if the location is an enemy target, the circuit 42' may be configured to select additional parameters that may be useful to the weapons system or to command personnel. At Step 96, the circuit 42' instructs the user (via, for example, a displayed menu) to select the type of the target (such as the size of the target) or the type of weapon that should be used. At Step 98, the user is instructed to select a weapon intercept timing (i.e., when a missile should be launched) or a timing sequence (the order in which multiple targets should be hit). At Step 100, the user can select a weapon approach vector, indicating from which direction a missile should approach the target.

Finally, at Step 102, after the target's coordinates and any additional parameters are acquired, the circuit 42' instructs the transmitter 40 to send the data to the battlefield network or the weapon launcher.

The circuit 42' may also be configured to acquire additional parameters as desired. These additional parameters are optional features that may increase the complexity of the system. In the simplest embodiment, the device 60 is used in a "fire and forget" mode, in which the user aims the device 60 at the target and just pushes a button, causing a missile to be dispatched to the target.

The control circuit 42' may be implemented using, for example, discrete logic circuits, FPGAs, ASICs, etc. Alternatively, the control circuit 32 may be implemented in software executed by a microprocessor. Other implementations can also be used without departing from the scope of the present teachings.

In a preferred embodiment, the optical scope 62 also includes thermal imaging capabilities, allowing the device 60 to be aimed at night. The scope 62 may also be equipped with a feature allowing it to acquire targets around corners, minimizing the warrior's exposure to danger.

Thus, the target acquisition device 60 of the present invention gives the warrior a weapon that is highly portable, powerful, and accurate, and reduces the amount of time and the degree to which warriors may be exposed to enemy fire during target acquisition. The warrior spends no time making measurements and calculations. A missile can be dispatched to a target quickly and accurately upon the push of a button. If desired, the warrior can designate additional parameters such as the amount of firepower to be delivered, the time the target should be fired upon, and the direction from which a missile should approach the target. The device 60 may be used to acquire the coordinates of other types of locations such as keep-out locations, potentially reducing the amount of collateral damage. A target's coordinates may be transmitted to a weapon launcher, directly controlling a remote weapons system, or they may be sent to a battlefield network, allowing command personnel to authorize and control weapon fire.

The target acquisition device 60 can also be used for purposes other than target acquisition. The laser rangefinder 38, GPS receiver 34, optical scope 62, etc. in the device 60 may be used independently. This potentially reduces the amount of equipment and weight a warrior may be asked to carry.

The present teachings may also be applied to a target acquisition system for a remotely-controlled robot, such as a land-based rover or an unmanned aerial vehicle (UAV). In this case, the target acquisition system may also include a detector coupled to the optical sight and adapted to capture the image obtained by the optical sight. The captured image data can then be transmitted to a remote user who uses the image data to aim the sight and acquire a target.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A target acquisition system comprising:
a housing;
circuitry for obtaining position coordinates of the housing;
means for measuring a pointing angle from the housing toward a target;
a rangefinder for determining a distance between the housing and the target; and
circuitry for calculating coordinates of the target using the pointing angle, the distance and the position coordinates of the housing,
wherein when the distance is unable to be determined by the range finder, the circuitry is configured to:
provide an indication to a user to acquire an additional set of data from a different position; and
calculate the coordinates of the target without the use of the distance data from the rangefinder using the additional set of data, the additional set of data including additional position coordinates from the different position and a pointing angle from the additional position coordinates to the target.

2. The target acquisition system of claim 1 wherein the system further includes a transmitter for transmitting the coordinates of the target to a network or remote weapons system, and
wherein the additional set of data is either provided from another device or determined by the target acquisition system at the different position.

3. The target acquisition system of claim 1 wherein the system further includes means for receiving a user signal and in response thereto acquiring the position coordinates of the housing and pointing angle.

4. The target acquisition system of claim 3 wherein the system further includes means for interfacing with a user to generate the user signal.

5. The target acquisition system of claim 1 wherein the system further includes a transmitter for transmitting the position coordinates of the housing and pointing angle data to another device to allow the other device to determine the coordinates of the target without use of distance data.

6. The target acquisition system of claim 1 wherein the system further includes means for classifying the target.

7. The target acquisition system of claim 6 wherein the system includes means for designating whether the target is an enemy target, keep-out location, or weapon abort location.

8. The target acquisition system of claim 1 wherein the system further includes means for designating a type of weapon that should be dispatched to the target.

9. The target acquisition system of claim 1 wherein the system further includes means for designating a time when a weapon should be dispatched to the target.

10. The target acquisition system of claim 1 wherein the system further includes means for designating a direction from which a weapon should approach the target.

11. The target acquisition system of claim 1 wherein the system further includes means for designating one or more parameters for the target.

12. The target acquisition system of claim 1 wherein the rangefinder is said fourth means includes a laser rangefinder housed by the housing.

13. The target acquisition system of claim 1 wherein the circuitry for obtaining the position coordinates of the housing includes a Global Positioning System receiver housed by the housing.

14. The target acquisition system of claim 1 wherein the means for measuring a pointing angle includes a solid-state inertial measurement unit housed by the housing.

15. The target acquisition system of claim 1 wherein the means for measuring a pointing angle includes one of a digital compass and an inclinometer housed by the housing.

16. The target acquisition system of claim 1 wherein the system further includes an optical sight for aiming the housing.

17. A target acquisition device comprising:
a housing;
an optical sight for aiming the housing at a target;
a Global Positioning System receiver for determining a position coordinates of the housing;
a direction measuring mechanism for determining a pointing angle toward which the housing is aimed;
a laser rangefinder for determining a distance between the housing and the target;
a user interface for interfacing with a user; and
a control circuit configured to receive a signal from the user interface and in response thereto acquire housing position coordinates, pointing angle, and distance data from the Global Positioning System receiver, direction measuring mechanism, and laser rangefinder, respectively, and use the housing position coordinates, the pointing angle, and the distance data to calculate position coordinates of the target,
wherein when there is an insufficient laser return from the laser rangefinder to determine the distance, the control circuit is further configured to:
indicate to the user to acquire an additional set of data from a different position; and
calculate the position coordinates of the target without the use of the distance data from the laser rangefinder using the additional set of data,
wherein the additional set of data includes additional position coordinates from the different position and a pointing angle from the additional position coordinates to the target.

18. The target acquisition device of claim 17 wherein the device further includes a transmitter for transmitting the position coordinates of the target to a network or remote weapons system, and
wherein the additional set of data is either generated by the target acquisition device from the different position or provided by another target acquisition device.

19. The target acquisition device of claim 17 wherein the control circuit includes logic for computing the position coordinates of the target from two or more sets of data when there is insufficient laser return from the laser rangefinder to determine the distance, each data set including position coordinates and a pointing angle from the position coordinates of the data set to the target.

20. The target acquisition device of claim 17 wherein the optical sight, Global Positioning System receiver, direction measuring mechanism, laser rangefinder, and control circuit are housed by the housing.

21. A method for acquiring a target including the steps of:
aiming a housing at the target;
determining position coordinates of the housing;
measuring a pointing angle toward which the housing is aimed;
measuring a distance between the housing and the target;
computing coordinates of the target from the position coordinates of the housing, pointing angle, and the distance; and
when the distance is unable to be measured, the method comprises:
indicating to a user to acquire an additional set of data from a different position of the housing; and
calculating the coordinates of the target without the use of the distance using the additional set of data, the additional set of data including additional position coordinates from the different position and a pointing angle from the additional position coordinates to the target.

* * * * *

UNITED STATES PATENT AND TRADEMARK OFFICE
CERTIFICATE OF CORRECTION

PATENT NO. : 8,020,769 B2  Page 1 of 1
APPLICATION NO. : 11/804832
DATED : September 20, 2011
INVENTOR(S) : Thomas F. Papale et al.

It is certified that error appears in the above-identified patent and that said Letters Patent is hereby corrected as shown below:

On Sheet 1 of 4, below No. 4, Figure 1, line 1, delete "Continous" and insert -- Continuous --, therefor.

In column 6, line 32, in Claim 1, delete "range finder," and insert -- rangefinder, --, therefor.

In column 7, line 12, in Claim 12, after "is" delete "said fourth means includes".

Signed and Sealed this
Eighth Day of November, 2011

David J. Kappos
*Director of the United States Patent and Trademark Office*